US010326615B2

(12) United States Patent
Baboescu et al.

(10) Patent No.: US 10,326,615 B2
(45) Date of Patent: Jun. 18, 2019

(54) CELLULAR-WIRELESS LOCAL AREA NETWORK (WLAN) INTERWORKING

(71) Applicant: Broadcom Corporation, Irvine, CA (US)

(72) Inventors: Florin Baboescu, Solana Beach, CA (US); Petrea Timariu, San Diego, CA (US); Vinko Erceg, Cardiff, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 135 days.

(21) Appl. No.: 15/093,699

(22) Filed: Apr. 7, 2016

(65) Prior Publication Data

US 2016/0302110 A1    Oct. 13, 2016

Related U.S. Application Data

(60) Provisional application No. 62/146,175, filed on Apr. 10, 2015.

(51) Int. Cl.
*H04L 12/46* (2006.01)
*H04W 28/08* (2009.01)
*H04W 76/12* (2018.01)
*H04W 36/00* (2009.01)
*H04W 76/15* (2018.01)

(52) U.S. Cl.
CPC ......... *H04L 12/4633* (2013.01); *H04W 28/08* (2013.01); *H04W 76/12* (2018.02); *H04W 36/0027* (2013.01); *H04W 76/15* (2018.02)

(58) Field of Classification Search
CPC . H04W 36/08; H04W 36/30; H04W 36/0022; H04W 28/08; H04L 12/4633
See application file for complete search history.

(56) References Cited

U.S. PATENT DOCUMENTS

| 2006/0153124 | A1* | 7/2006 | Kant ................... | H04W 76/10 370/328 |
| 2012/0144047 | A1* | 6/2012 | Armstrong .......... | H04L 12/4633 709/228 |
| 2013/0286826 | A1* | 10/2013 | Park .................. | H04W 28/0231 370/230 |
| 2014/0036705 | A1* | 2/2014 | Ma ..................... | H04W 28/0231 370/252 |

(Continued)

*Primary Examiner* — Warner Wong
(74) *Attorney, Agent, or Firm* — Morgan, Lewis & Bockius LLP

(57) ABSTRACT

A device for facilitating cellular-wireless local area network (WLAN) interworking may include at least one processor circuit. The processor circuit may be configured to receive a packet including a first tunnel identifier and addressed to a user equipment (UE). The processor circuit may be configured to identify a radio bearer associated with the first tunnel identifier, where the radio bearer is configured to facilitate transmission of the packet to the UE via cellular communications. The processor circuit may be configured to determine whether the radio bearer has been offloaded over a WLAN. The processor circuit may be configured to, when the radio bearer has been offloaded over the WLAN, identify a second tunnel identifier mapped to the radio bearer; encapsulate the packet based on the second tunnel identifier, where the encapsulated packet includes the second tunnel identifier; and transmit the encapsulated packet to the UE over the WLAN.

19 Claims, 11 Drawing Sheets

(56) References Cited

U.S. PATENT DOCUMENTS

| | | | |
|---|---|---|---|
| 2014/0071942 A1* | 3/2014 | Ye | H04W 36/14 370/331 |
| 2014/0092742 A1* | 4/2014 | Chou | H04W 4/70 370/235 |
| 2014/0153546 A1* | 6/2014 | Kim | H04W 48/18 370/332 |
| 2014/0341038 A1* | 11/2014 | Lim | H04W 28/08 370/235 |
| 2015/0111569 A1* | 4/2015 | Gupta | H04L 65/1069 455/426.1 |
| 2015/0138962 A1* | 5/2015 | Tipton | H04W 28/08 370/230 |
| 2015/0163692 A1* | 6/2015 | Babaei | H04W 4/18 370/338 |
| 2015/0195743 A1* | 7/2015 | Sirotkin | H04W 28/08 370/235 |
| 2015/0215839 A1* | 7/2015 | Johansson | H04W 36/30 455/426.1 |
| 2015/0245268 A1* | 8/2015 | Williams | H04W 76/14 370/331 |
| 2015/0312831 A1* | 10/2015 | Sang | H04W 36/0083 370/236 |
| 2015/0327129 A1* | 11/2015 | Faccin | H04W 36/0055 370/331 |
| 2015/0327139 A1* | 11/2015 | Sirotkin | H04W 36/30 370/332 |
| 2016/0007238 A1* | 1/2016 | Salkintzis | H04W 36/0022 455/439 |
| 2016/0007257 A1* | 1/2016 | Kim | H04W 76/34 370/331 |
| 2016/0021698 A1* | 1/2016 | Zhao | H04L 12/4633 370/329 |
| 2016/0183125 A1* | 6/2016 | Sun | H04W 28/08 455/453 |
| 2016/0198364 A1* | 7/2016 | Schwarzbauer | H04W 28/08 370/331 |
| 2016/0205592 A1* | 7/2016 | Koskinen | H04W 28/08 370/230 |
| 2016/0234749 A1* | 8/2016 | Singh | H04W 36/0022 |
| 2017/0111822 A1* | 4/2017 | Jung | H04W 28/08 |

* cited by examiner

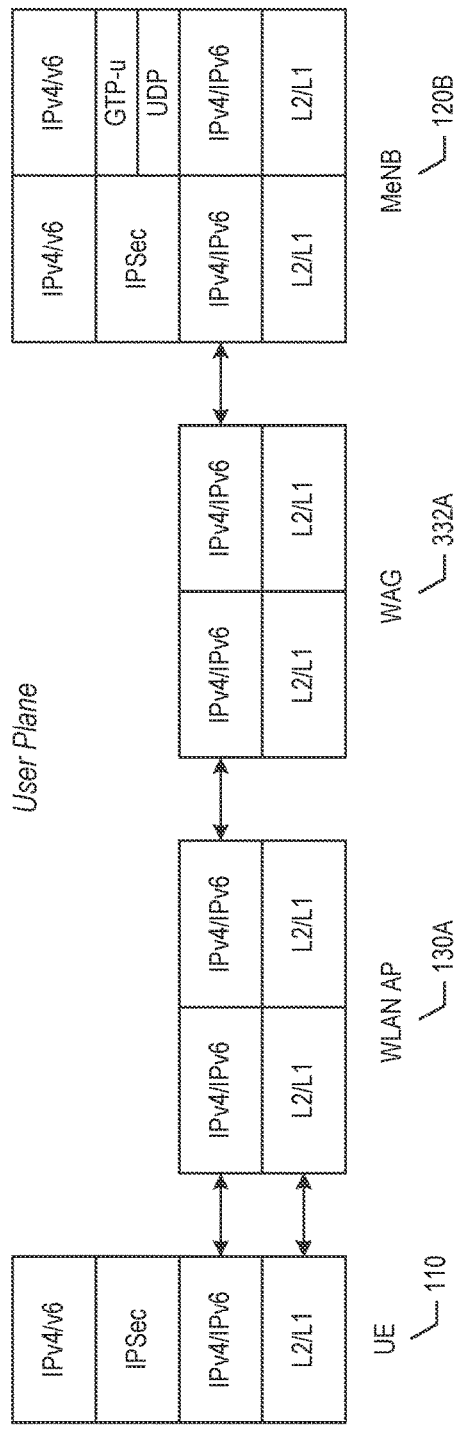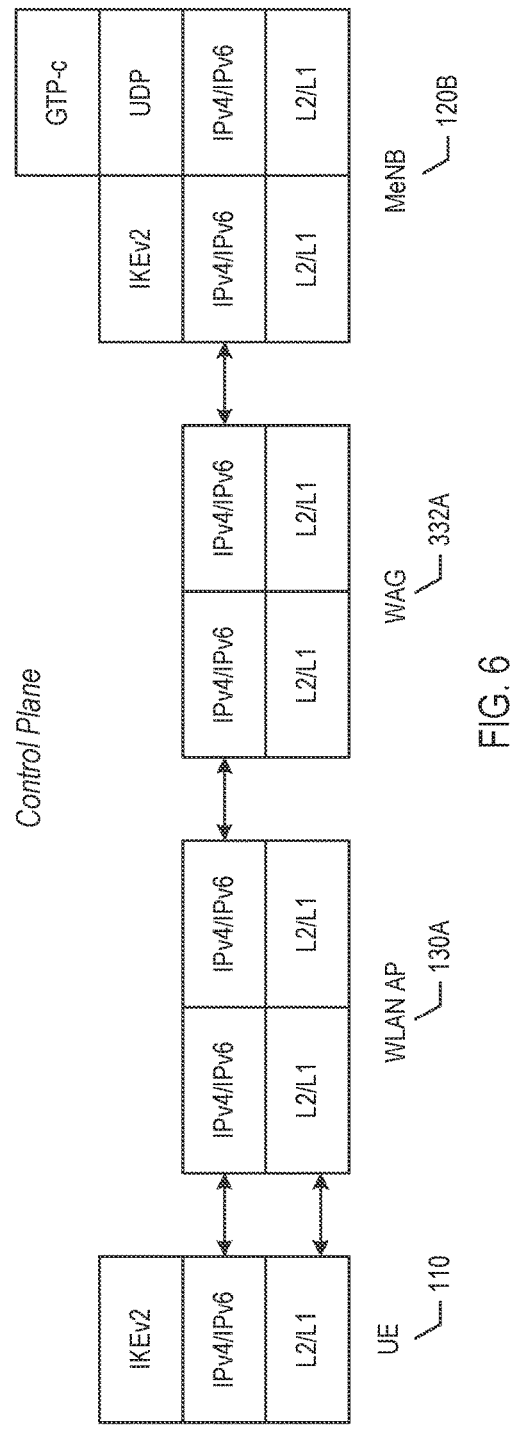

CELLULAR-WIRELESS LOCAL AREA NETWORK (WLAN) INTERWORKING

CROSS-REFERENCE TO RELATED APPLICATIONS

The present application claims the benefit of U.S. Provisional Patent Application Ser. No. 62/146,175, entitled "Cellular-WLAN Interworking," filed on Apr. 10, 2015, which is hereby incorporated by reference in its entirety for all purposes.

TECHNICAL HELD

The present description relates generally to wireless networks, including cellular-wireless local area network (WLAN) interworking.

BACKGROUND

Cellular-WLAN interworking allows for traffic offloading between a cellular technology and a WLAN technology. Such interworking may improve quality of service of a user device, user device coverage, and/or reduce battery power consumption.

BRIEF DESCRIPTION OF THE DRAWINGS

Certain features of the subject technology are set forth in the appended claims. However, for purpose of explanation, several embodiments of the subject technology are set forth in the following figures.

FIG. 5 illustrates example protocol stacks for user plane over WLAN access using Internet Protocol Security (IPSec) in accordance with one or more implementations.

FIG. 6 illustrates example protocol stacks for control plane over WLAN access using IPSec in accordance with one or more implementations.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
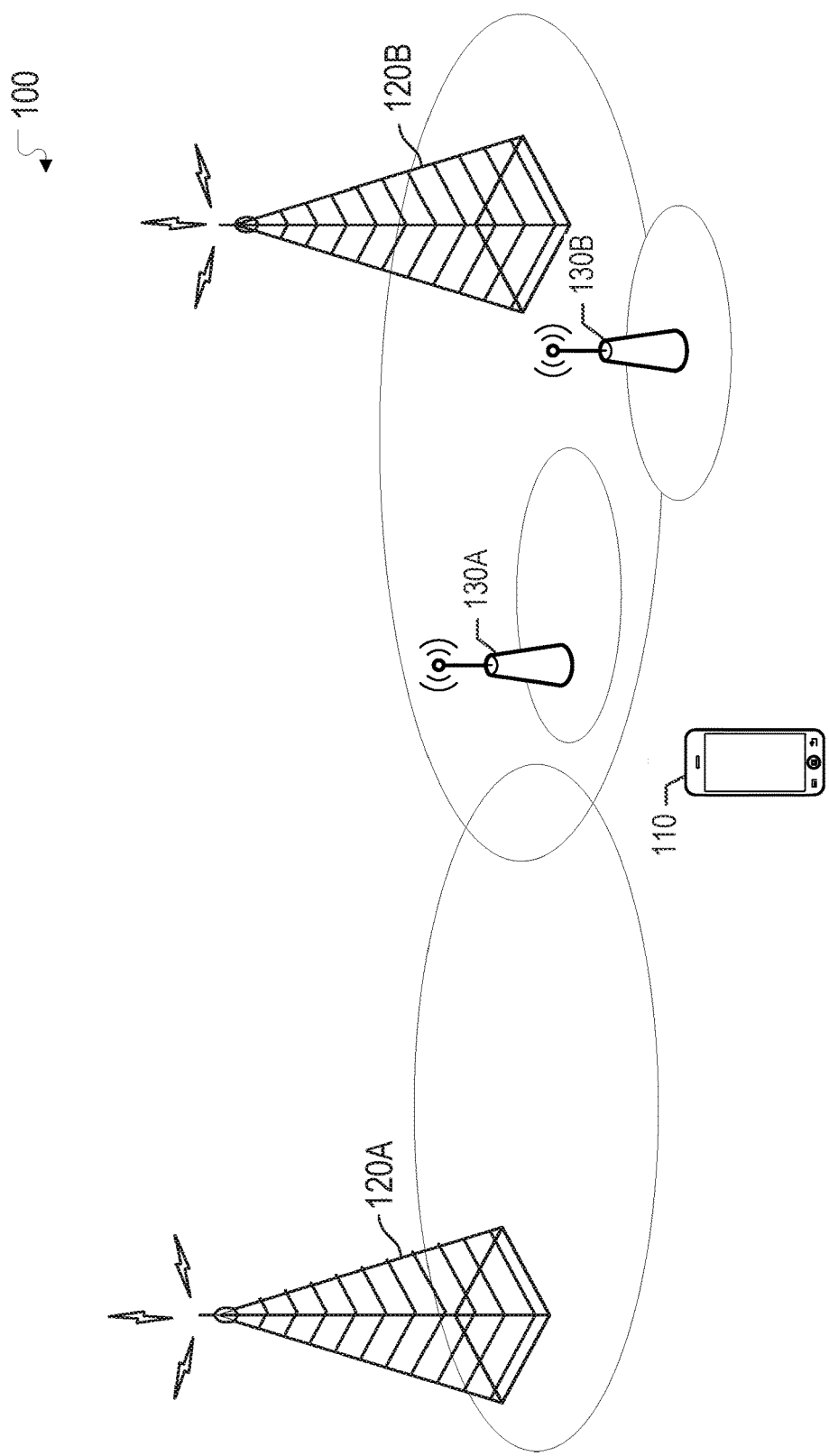
FIGS. 1, 2, 3, and 4 illustrate example network environments in which cellular-WLAN interworking may be implemented in accordance with one or more implementations.

FIG. 1 illustrates an example network environment 100 in which cellular-WLAN interworking may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a user device 110, base stations 120A-B, and access points 130A-B. The user device 110 may include, may be a component of, and/or may be referred to as, a User Equipment (HE). The user device 110 includes suitable logic, circuitry, interfaces, memory, and/or code that enables communications, e.g., with one or more of the base stations 120A-B and/or one or more of the access points 130A-B, via wireless interfaces and utilizing one or more radio transceivers. The user device 110 may also be operable to communicate wirelessly with one or more other user devices, one or more other base stations, and/or one or more other access points not shown in FIG. 1.

The user device 110 may be, and/or may include, a mobile phone, a personal digital assistant (PDA), a tablet device, a computer, or generally any device that is operable to communicate wirelessly with one or more of the base stations 120A-B and/or one or more of the access points 130A-B. The user device 110 may be, and/or may include one or more components of the system discussed below with respect to FIG. 12.

One or more of the base stations 120A-B may include, may be a component of, and/or may be referred to as, a cell, a Node B (NB), an Evolved Universal Mobile Telecommunications System (UMTS) Terrestrial Radio Access Network (E-UTRAN) Node B, an Evolved NodeB (eNodeB or eNB), a Master eNodeB (MeNB), or a Home eNB (HeNB). One or more of the base stations 120A-B includes suitable logic, circuitry, interfaces, memory, and/or code that enable communications, e.g., with the user device 110 and/or one of the other base stations 120A-B, via wireless interfaces and utilize one or more radio transceivers. One or more of the base stations 120A-B is also operable to communicate wirelessly with one or more other user devices and/or one or more other base stations not shown in FIG. 1. In one or more implementations, one or more of the base stations 120A-B is a base station of a cellular-based wireless network, such as a Long Term Evolution (LTE) communications network, Global System for Mobile (GSM) communications network, UNITS communications network, or generally any cellular-based communications network. One or more of the base stations 120A-B may be, and/or may include one or more components of the system discussed below with respect to FIG. 12.

One or more of the access points 130A-B may include, may be a component of, and/or may be referred to as, a WLAN access point. One or more of the access points 130A-B includes suitable logic, circuitry, interfaces, memory, and/or code that enable communications, e.g., with the user device 110 and/or one of the other WLAN access points 130A-B, via wireless interfaces and utilize one or more radio transceivers. One or more of the WLAN access points 130A-B is also operable to communicate wirelessly with one or more other user devices and/or one or more other access points not shown in FIG. 1. One or more of the WLAN access points 130A-B may be, and/or may include one or more components of, the system discussed below with respect to FIG. 12.

In one or more implementations, the subject technology facilitates WLAN deployment in a radio access network (RAN), such as an LTE communications network. In FIG. 1, the cellular components of the RAN may include the base stations 120A-B whereas the WLAN components deployed in the RAN (e.g., WLAN components that support RAN-integrated connectivity) may include the access points 130A-13. In some cases, one or more of the base stations 120A-B may be communicatively coupled to one or more of the access points 130A-B, e.g., via a WLAN access gateway (WAG) device and/or WLAN controller (WLC) not explicitly shown in FIG. 1. In some cases, the subject technology may be utilized in dense, venue type of deployment in which multiple WLAN access points (e.g., the access points 130A-B) are deployed in order to provide one or more user equipment (e.g., the user device 110) with improved over the air aggregated throughput.

For example, one or more of the access points 130A-B may facilitate higher throughput transmissions than can be achieved via one or more of the base stations 120A-B. Accordingly, in some instances it may be preferable for the user device 110 to be served by one or more of the access points 130A-B, in lieu of and/or in addition to one or more of the base stations 120A-B, when the user device 110 is under the coverage of one or more of the access points 130A-B.

In one scenario, the user device 110 may be under cellular (e.g., LTE) coverage of the base station 120A. At one point, the user device 110 may arrive in a venue area where connectivity is provided by the base station 120B that has an integrated WLAN capability (e.g., capability to communicate with WLAN-based networks). When the user device 110 is also within a coverage area of the access point 130A and the access point 130A has connectivity to the user device 110's public land mobile network (PLMN) in the cellular network, e.g. through the base station 120B, the user device 110 may associate with the access point 130A and may be handed over from the base station 120A to the base station 120a After the association with the access point 130A and the handover to the base station 120B, over the air data traffic of the user device 110 may be steered through the access point 130A and/or the base station 120B. For instance, some over the air data traffic of the user device 110 may be steered through the access point 130A while some over the air data traffic of the user device 110 may be steered through the base station 120B.

In another scenario, the user device 110 may be in a venue under coverage of both the base station 120B and the access point 130A with over the air data traffic of the user device 110 being routed through the base station 120B and/or the access point 130A. As the user device 110 moves through the venue, the user device 110 may be handed over (e.g., handed over seamlessly) from the access point 130A to the access point 130B. In some cases, the handover from the access point 130A to the access point 130B may be performed based on the Institute of Electrical and Electronics Engineers (IEEE) 802.11r and 802.11k specifications, which provide protocols for enabling seamless handover as a device (e.g., the user device 110) moves in a coverage area. In these cases, the access points 130A-B support IEEE 802.11r and 802.11k.

In another scenario, the user device 110 may be moving in a venue and reach an area without WLAN over the air coverage. While in this area, the over the air traffic of the user device 110 may be handled by the base station 120B. When the user device 110 is back under WLAN coverage (e.g., of the access point 130B), the data traffic over the air may be handled by the WLAN (e.g., by the access point 130B) and/or the base station 120B.

In another scenario, the user device 110 may arrive in a WLAN cell (e.g., the access point 130B) proper cellular coverage. In this scenario, signaling and data over the air may be handled exclusively over WLAN.

Figure 2:
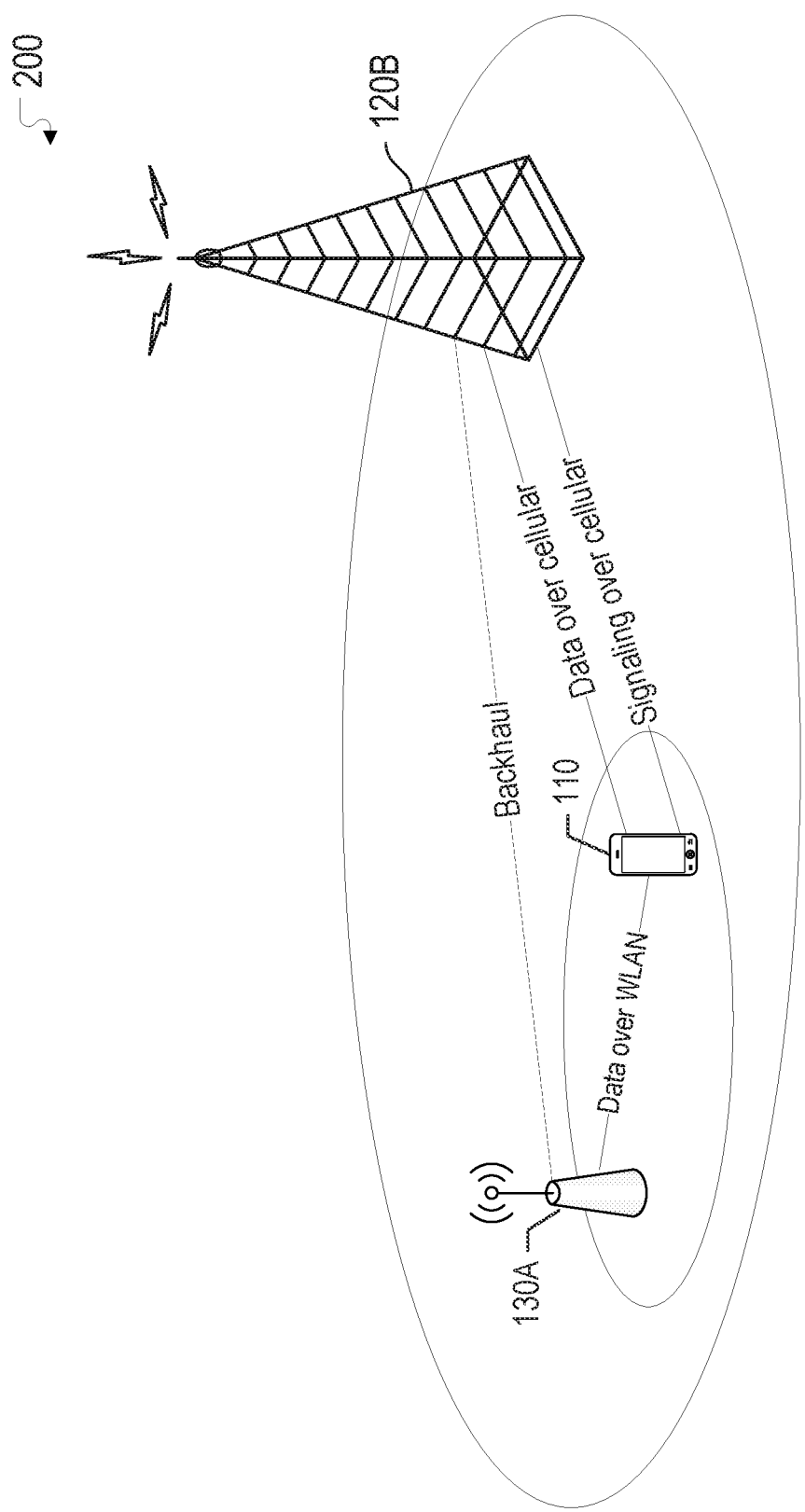

FIG. 2 illustrates an example network environment 200 in which cellular-WLAN interworking, may be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example network environment 200 includes the user device 110, the base station 120B, and the access point 130A. The user device 110 may be simultaneously connected to a cell group through the base station 120B and a WLAN network through the access point 130A. For instance, the cell group may be a master cell group and the base station 120B may be an MeNB.

The user device 110 and the base station 120B may exchange user data and/or signaling (e.g., control data) using a cellular standard (e.g., LTE standard). The base station 120B may offload user data for the user device 110 onto the access point 130A via a WLAN network, such that the offloaded user data may be transmitted by the access point 130A to the user device 110 using a WLAN standard (e.g., IEEE 802.11ac standard). In this regard, the base station 120B may utilize the WLAN network as a backhaul network; alternatively and/or in addition the base station 120B may utilize a wired connection for the backhaul network. The backhaul may be a non-ideal backhaul. In some cases, the access point 130A may be utilized as a Secondary eNB (SeNB) for providing additional resources for the user device 110. The offloading may be based on an offload preference indicator (OPI). The ON may be utilized as a mechanism that allows RAN control of the level of traffic offload between the base station 120B and the access point 130A while also considering traffic and user profile separation.

An entry point for a WLAN data plane connection to the WLAN network may be provided by a WAG device. Interfaces between the access point 130A and the WAG device may have assigned locally scoped Internet Protocol (IP) addresses. The access point 130A may be operated in an autonomous mode (e.g., local configuration and control). In autonomous deployments, the WAG device may be a residential gateway device. Alternatively, the access point 130A may be coordinated and managed by a WLC. In this case, a control plane connection may be present between the access point 130A and the WLC.

Figure 3:
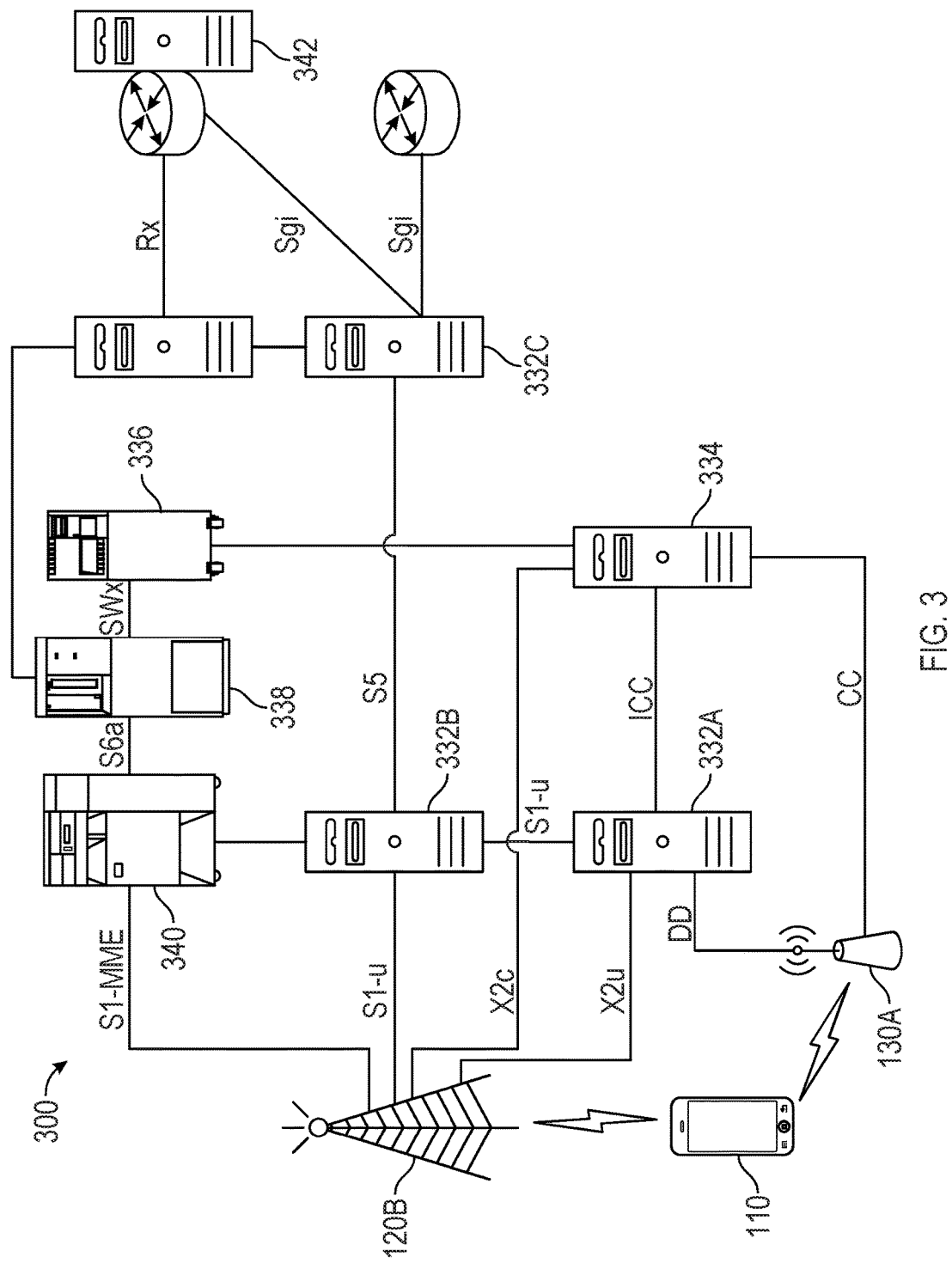

FIG. 3 illustrates an example network environment 300 in which cellular-wireless interworking may be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example network environment 300 includes the user device 110, the base station 120B, the access point 130A, one or more gateway devices 332A-C, a controller 334, an authentication, authorization, and accounting (AAA) server 336, a home subscriber server (HSS) 338, a mobility management entity (MIME) 340, and a proxy call session control function (P-CSCF) device 342. Connections between the various components of the example network environment 300 are labeled with an example of an interface between the components. For instance, an S1-u interface may be a user plane interface between the base station 120B and the gateway device 332B, and an X2u interface may be a user plane interface between the base station 120B and the gateway device 332A. The X2u interface may also be referred to as an Xw-u interface.

The access point 130A may be coordinated and managed by the controller 334, such as in a Service Provider WLAN deployment. The controller 334 may include, may be a component of, and/or may be referred to as a WLC. In some cases, the WLC may include, may be a component of, and/or may be referred to as a WLAN access proxy (WAP). The WAP may include, or may be a component of, an authentication server utilized to facilitate sharing of WLAN-infrastructure with devices that do not support cellular communication. For instance, the WAP may differentiate between different types of services and devices. In deployments such as Service Provider WLAN deployments, there is a control plane connection between the access point 130A and the controller 334. Alternatively, the access point 130A may be operated in autonomous mode (e.g., local configuration and control).

The gateway device 332A may include, may be a component of, and/or may be referred to as a WAG device. In autonomous deployments, for example, the WAG device may be a residential gateway device. An entry point for a WLAN data plane connection to the WLAN network may be provided by the WAG device. The interfaces between the access point 130A and the gateway device 332A may have assigned locally scoped IP addresses.

The gateway device 332B may be, or may include, a serving gateway (S-GW) device. In some cases, the gateway device 332B may be utilized as a mobility anchor through which user data (e.g., IP packets) may be transmitted. For instance, the gateway device 332B may serve as a mobility anchor for data bearers when the user device 110 moves between different base stations.

The gateway device 332C may be, or may include, a packet data network (PDN) gateway (P-GW) device. The gateway device 332C may be utilized for IP address allocation for the user device 110, quality of service (QoS) enforcement, and/or flow-based charging according to rules from a policy control and charging rules function (PCRF). The PCRF may determine how to handle data flow associated with the user device 110 based on a user's subscription profile. The gateway device 332C may be utilized to filter user data (e.g., downlink user IP packets) into different QoS-based bearers using traffic flow templates (TFTs). In some cases, TFTs may be utilized to map service data flows to radio bearers. For instance, an uplink TFT (UL TFT) may be utilized to map service data flows to radio bearers in the uplink direction.

The HSS 338 may store System Architecture Evolution (SAE) subscription data for various users (e.g., a user of the user device 110), such as a subscribed QoS profile. The HSS 338 may store information about the PDNs to which a user may connect. The MIME 340 may be utilized for processing signaling between the user device 110 and a core network (CN). In some cases, the protocols running between the user device 110 and the core network may be referred to as non-access stratum (NAS) protocols.

The core network, which may also be referred to as an Evolved Packet Core (EPC), may include the S-GW device (e.g., the gateway device 332B), P-GW device (e.g., the gateway device 332C), HSS 338, and MME 340. The S-GW device, P-GW device, HSS 338, and MME 340 may be provided in fewer than or more than four individual devices. In some cases, the base station 120B may be an MeNB that terminates at least S1-MME and therefore acts as a mobility anchor towards the core network. In some cases, each UE is associated with only one S1-MME connection, and the S1-MME connection is terminated at an MeNB.

In one or more implementations, the subject technology provides a user plane and control plane for cellular-WLAN interworking. The cellular technology may be LTE technology. The user plane for RAN-based cellular-WLAN interworking may allow termination of an interface (e.g., an S1-u interface) in the base station 120B. The user plane may also allow traffic differentiation and QoS at a radio bearer level over both accesses (e.g., LTE, WLAN).

Figure 4:
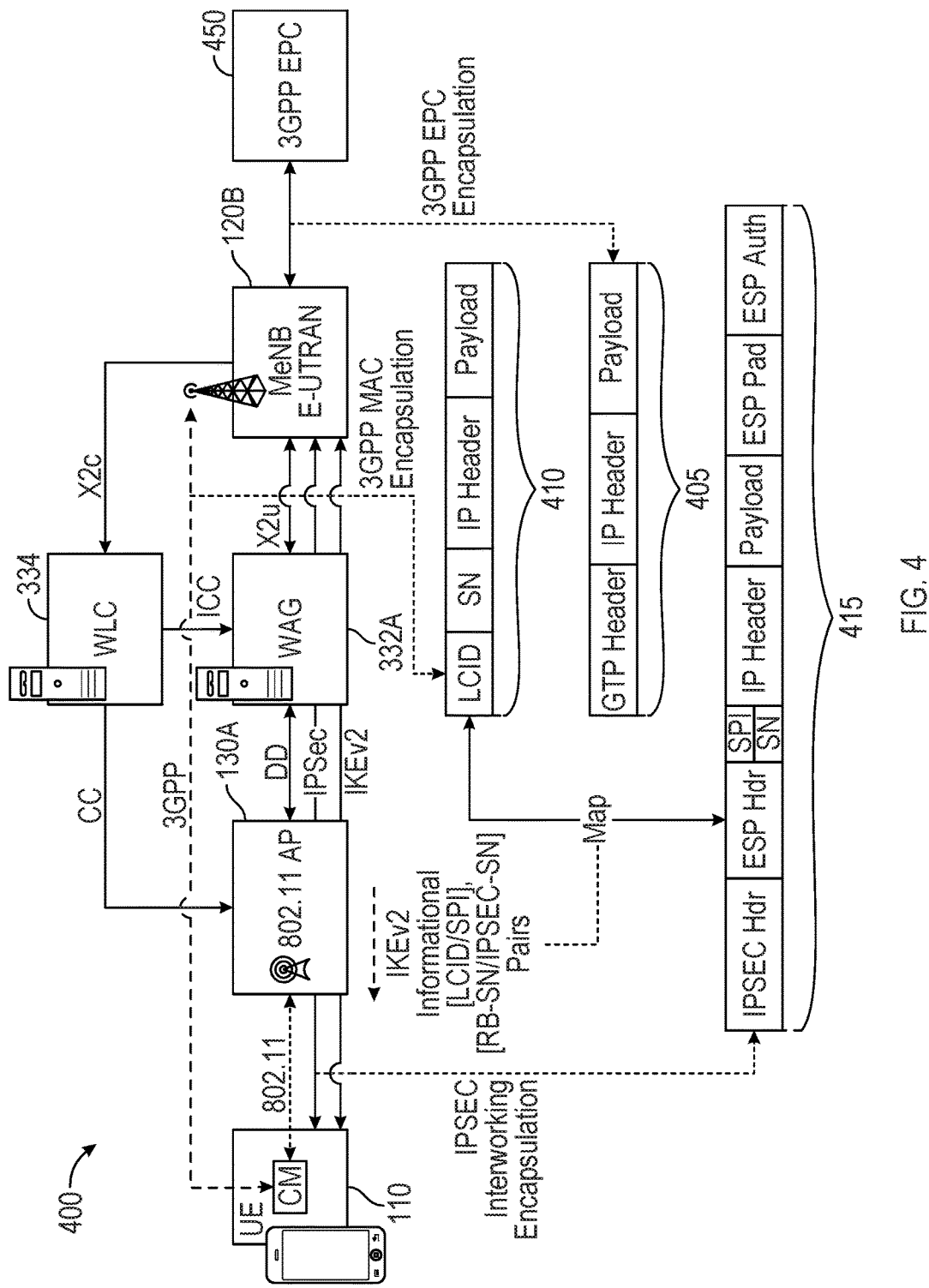

FIG. 4 illustrates an example network environment 400 in which cellular-wireless interworking, may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 400 includes an EPC 450, the base station 120B, the gateway device 332A, the controller 334, the access point 130A, and the user device 110. The user device 110 may include a connection manager (CM). The EPC 450 may include an S-GW device (e.g., the gateway device 332B), P-GW device (e.g., the gateway device 332C). HSS 338, and MME 340.

A General Packet Radio Service (GPRS) tunneling protocol (GPRS TP or GTP) tunnel may be established and utilized between the base station 120B and the EPC 450. In general, a GTP tunnel may be utilized to carry GPRS packets within a cellular-based wireless network (e.g., LTE, GSM, UMTS communications network). GTP may be decomposed into separate protocols, including GTP-c (control plane GTP) for signaling within the EPC 450 and GTP-u (user plane GTP) for carrying user data within the EPC 450 and between the base station 120B and the EPC 450. In some cases, GTP may be utilized with transport layer protocols, such as the Transmission Control Protocol (TCP) and User Datagram Protocol (UDP). The user device 110 may be associated with one or more GTP tunnels, with each separate tunnel being identified by a respective tunnel endpoint identifier (TEID). The TEID may be a dynamically allocated random number and may be utilized to multiplex different connections in the same GTP tunnel. In some cases, a receiving side of a CAT tunnel may assign the TEID value for a transmitting side to use. In some cases, GTP-c signaling (e.g., GTP-c messages) may be transmitted between the gateway device 332B and gateway device 332C. For instance, the TEID values may be exchanged between tunnel endpoints using GTP-c messages.

In some cases, the base station 120B may store a mapping (e.g., a one-to-one mapping) between radio access bearer identifiers (RB-IDs) and TEIDs. An interface between the gateway device 332B and the base station 120B, and between the gateway device 332B and the gateway device 332A, may be a S1-u interface. The TEIDs associated with the tunnel between the gateway device 332B and the base station 120B may be referred to as S1-TEIDs.

Datapaths for transferring data over WLAN may facilitate data transfer for a radio access bearer (RAB) being tunneled over WLAN (e.g. via the access point 130A) between the base station 120B and the user device 110. The RAB may be a cellular channel through which data may be carried. The RAB may be a signaling radio bearer for carrying signaling information or a data radio bearer for carrying user data. The data for each RAB may be transmitted through an IP-based tunneling mechanism over WLAN between the base station 120B and the user device 110. As one example, the data for each RAB is transmitted through an IP Security (IPSec) tunnel over WI-AN between the base station 120B and the user device 110. IPSec may allow authentication and encryption of IP packets. As another example, the data for each RAB is transmitted through a GTP tunnel (e.g., GTP-u tunnel) over WI-AN between the base station 120B and the user device 110. Other IP-based tunneling mechanisms aside from IPSec and GTP-u tunneling may be utilized. Further for explanatory purposes, the example network environment 400 utilizes IPSec tunneling over WLAN between the base station 120B and the user device 110.

The IPSec tunnel is created between the base station 120B and the user device 110 for each RAB that is offloaded over WLAN. The base station 120B may receive, from the EPC 450, a packet addressed to the user device 110. The packet may include a packet portion 405. The packet may be referred to as an EPC encapsulated packet. The packet portion 405 may include a GTP header, an IP header, and a payload (e.g., user data). The GTP header may contain a TEID associated with the RAB. Since an S1-u interface may provide a user plane interface between the EPC 450 and the base station 120B, the TEID contained in the GTP header may be referred to as an S1-TEID.

Forwarding of the downlink data traffic at the base station 120B may be performed by matching the TEID contained in the received packet portion 405 to a logical channel index (LCID) of the RAB. A logical channel may represent control channels for control plane data and/or traffic channels for user plane data. The logical channels may represent data transfer services provided by a media access control (MAC), and may be defined based on the type of information carried by the logical channels. Thus, the LCID of the RAB may provide an indication of data transfer services provided by a MAC and/or the type of information carried by the logical channel.

In a case where user data is transmitted via the RAB (e.g., via cellular communications), the LCID may be contained in a packet transmitted from the base station 120B to the user device 110 via cellular communications. The packet may include a packet portion 410. The packet may be referred to as a MAC encapsulated packet or MAC protocol data unit (PDU) encapsulated packet. The packet portion 410 may include the LOD, sequence number (SN). IP header, and payload (e.g., user data). The SN may be a monotonically increasing counter assigned to each packet transmitted by the base station 120B to the user device 110 to allow the user device 110 to reorder received packets and/or remove duplicate packets in accordance with the SN of each received packet.

In a case where the RAB is offloaded over WLAN, the base station 120B may generate a packet that includes a packet portion 415. The packet may be referred to as an IPSec interworking encapsulated packet or IPSec encapsulated packet. The packet portion 415 includes an IPSec header, Encapsulating Security Payload (ESP) header, a security parameter index (SPI), an SN, an IP header, a payload (e.g., user data). ESP padding, and ESP authentication. ESP may be utilized for authentication, integrity, and/or confidentiality protection of packets. The ESP padding may be utilized for encryption purposes, to extend payload data to a size that fits a cipher block size associated with encryption, and/or align with a next field. In some cases, the SN contained in the packet portion 415 and the packet portion 410 may be referred to as IPSec-SN and RB-SN, respectively.

The base station 120B may match the LCID of the RAB being offloaded over WLAN to an SPI value that is contained in the packet portion 415. In some cases, the SPI value may be a value that is allocated for each IPSec header, such that the IPSec header of each packet being transmitted through the IPSec tunnel contains a different SPI value. The SPI value may be utilized to identify a security association of the user device 110.

At the user device 110, the packet containing the packet portion 415 is associated with the SPI by matching the SPI value contained in the packet portion 415 to the LCID associated with the RAB. Similarly, on the uplink side, the matching of SPI and LCID (e.g., LCID→SPI→LCID) may be performed in the user device 110 and retrieved at the base station 120B. In such manners, protection and authentication are provided to the RAB traffic sent over WLAN.

The packet portions 405, 410, and 415 in FIG. 4 are provided as examples, and other fields may be present before, after, and/or between the fields indicated in the packet portions 405, 410, and 415. For instance, in some cases, the packet portion 415 may include a GTP header between the SN and the IP header.

An Internet Key Exchange protocol, such as IKEv2 protocol, may be used for IPSec tunnel setup. An IKEv2 information signaling messages may be utilized to allow the base station 120B and the user device 110 to agree upon and/or exchange LCID to SPI mapping and RB-SN to IPSec-SN mapping. The mappings may facilitate coordination between the cellular access and the WLAN access.

FIG. 5 illustrates example protocol stacks for user plane over WLAN access using IPSec in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In the downlink direction (e.g., from right to left in FIG. 5), the base station 120B may receive, from the EPC 450, a packet including user data and addressed to the user device 110. For instance, the base station 120B may receive the packet via a GTP-u tunnel between the base station 120B and the EPC 450. The packet may include, from bottom to top, a physical layer header (L1 header) and a MAC header (L2 header), a first IP header (e.g., IP version 4 header, IP version 6 header), a UDP header, a GTP-u header, and a second IP header. The first IP header may be referred to as an outer or outside IP header while the second IP header may be referred to as an inner or inside IP header. The base station 120B may utilize the GTP-u header to determine a radio bearer (e.g., data radio bearer) to which this packet belongs. For example, an identifier of the GTP-u header may be mapped to an identifier of the radio bearer. The base station 120B may encrypt the packet using IPSec. In some cases, the GTP-u header may be removed from the packet prior to the packet being encrypted using IPSec. The IPSec encrypted packet may then be IP forwarded (e.g., relayed) to the user device 110 via the gateway device 332A and the access point 130A. The user device 110 may map the SPI of the IPSec header of the received packet to the LCID.

In FIG. 5, nodes intermediate to the base station 120B and the user device 110 may perform IP forwarding of the encapsulated IPSec payload between the base station 120B and the user device 110. The intermediate nodes may include the gateway device 332A and the access point 130A. An interface (e.g., X2u interface) between the gateway device 332A and the base station 120B and an interface (e.g., DD interface) between the gateway device 332A and the access point 130A may be IP forwarding-based interfaces with no tunneling requirements.

FIG. 6 illustrates example protocol stacks for control plane over WLAN access using IPSec in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In the downlink direction (e.g., from right to left in FIG. 6), the base station 120B may receive, from the EPC 450, a packet including control data and addressed to the user device 110. For instance, the base station 120B may receive the packet via a GTP-c tunnel between the base station 120B and the EPC 450. The packet may include, from bottom to top, a physical layer header (L1 header) and a MAC header (L2 header), an IP header (e.g., IP version 4 header, IP version 6 header), a UDP header, and a GTP-c header. The base station 120B may remove the GTP-c header from the packet and utilize IKEv2 to carry the control data to the user device 110. The packet may be IP forwarded (e.g., relayed) to the user device 110 via the gateway device 332A and the access point 130A.

In one or more implementations, a GTP tunnel is utilized in tunneling user data over WLAN. For tunneling into the GTP (e.g., GTP-u) tunnel, a GTP tunnel is created between the base station 120B and the user device 110 for each RAB (e.g., data radio bearer) that is offloaded over WLAN. Such tunneling may assume one or more of encryption of IEEE 802.11 traffic (e.g., the access point 130A may setup encryption as mandatory for the user device 110), encrypted links between the access point 130A and the gateway device 332A and between the gateway device 332A and the base station 120B, and/or a trust relation with the intermediate nodes on the path between the access point 130A and the base station 120B. In some aspects, the encryption may be utilized for all IP data offloaded over WLAN and transmitted through the GTP (e.g., GTP-u) tunnel.

Figure 7:
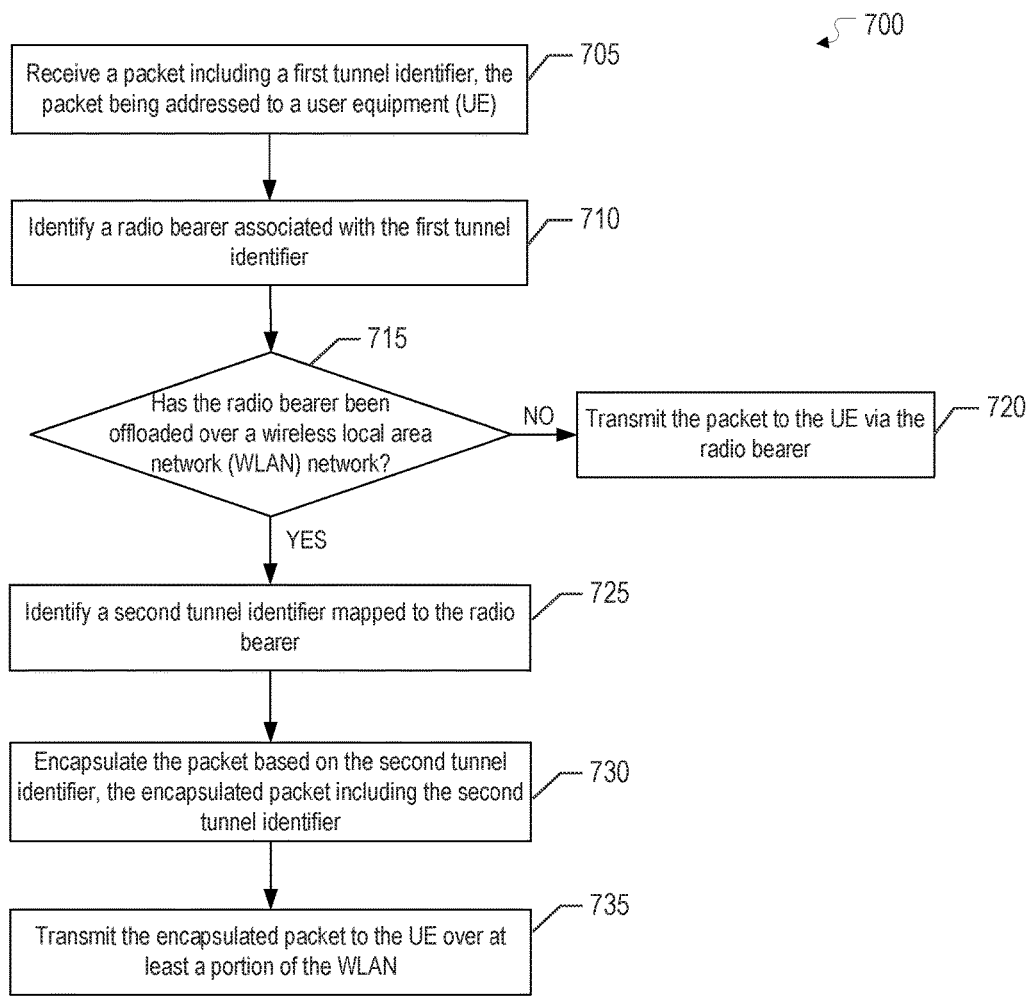
FIG. 7 illustrates a flow diagram of an example process in which cellular-WLAN interworking may be implemented in accordance with one or more implementations.

FIG. 7 illustrates a flow diagram of an example process 700 in which cellular-WLAN interworking may be implemented in accordance with one or more implementations. For explanatory purposes, the example process 700 is described herein with reference to the base station 120B of the example network environment 100 of FIG. 1; however, the example process 700 is not limited to the base station 120B of the example network environment 100 of FIG. 1, and the example process 700 may be performed by one or more components of the base station 120B, such as a base station processor and/or a cellular radio module. Further for explanatory purposes, for the example process 700 the base station 120B is the serving base station for the user device 110. The blocks of example process 700 are described herein as occurring in serial, or linearly. However, multiple blocks of example process 700 may occur in parallel. In addition, the blocks of example process 700 need not be performed in the order shown and/or one or more of the blocks of example process 700 need not be performed.

The base station 120B receives a packet (705). The packet may include a first tunnel identifier. The packet may be addressed to the user device 110. The base station 120B may receive the packet from the EPC 450. For instance, an S-GW (e.g., the gateway device 332B) of the EPC 450 may send the packet to the base station 120B over a tunnel (e.g., GTP-u tunnel) between the S-GW and the base station 120B. The first tunnel identifier may be a TED associated with the tunnel between the S-GW and the base station 120B.

The base station 120B identifies a radio bearer associated with the first tunnel identifier (710). The radio bearer may be a channel utilized to transmit the packet to the user device 110 via a cellular communication standard (e.g., LIE standard). The base station 120B may store a mapping (e.g., a one-to-one mapping) between an RB-ID and the tunnel identifiers. For instance, the base station 120B may store a mapping (e.g., a one-to-one mapping) between the RB-ID associated with the radio bearer and the TEID associated with the tunnel utilized by the radio bearer for cellular communications. The TEID may be associated with (e.g., mapped to) an LCID of the radio bearer.

The base station 120B determines whether the radio bearer has been offloaded over a WLAN network (or portion thereof) (715). The base station 120B may determine whether offloading has occurred based on whether the LCID of the radio bearer has been mapped to an SPI value. The base station 120B may determine that the radio bearer has been offloaded when the LCD has previously been mapped to an SPI value. The base station 120B may determine that the radio bearer has not been offloaded when the LCID has not been mapped to an SPI value. The SPI value may be agreed upon between the base station 120B and the user device 110 when establishing offloading. When the base station 120B determines that the radio bearer has not been offloaded over the WLAN network, the base station 120B transmits the packet to the user device 110 via the radio bearer (e.g., via LTE) (720).

When the base station 120B determines that the radio bearer has been offloaded over the WLAN network (or portion thereof), the base station 120B identifies a second tunnel identifier mapped to the radio bearer (725). The second tunnel identifier may be the SPI value. The base station 120B encapsulates the packet based on the second tunnel identifier (730). For example, the base station 120B may encrypt the packet using the IPSec encryption associated with the SPI value. The encapsulated packet (e.g., a packet including the packet portion 415) may include the second tunnel identifier. In some cases, the second tunnel identifier may be contained in an ESP header of the encapsulated packet. The base station 120B transmits the encapsulated packet to the user device 110 over the WLAN (735).

In the subject technology, a RAN-based implementation for facilitating cellular-WLAN interworking may provide a similar type of QoS profile for each RAB regardless of by which access (e.g., cellular or WLAN) the RAB is being served. The QoS profile may include information related to one or more aspects of network service, such as, by way of non-limiting example, desired minimum error rate, desired bit rate, desired throughput, etc. Accordingly, the a QoS characteristics of each WLAN network may be stored and compared to QoS requirements of each RAB, i.e. to determine whether the RAB can be offloaded over the WLAN network.

Figure 8:
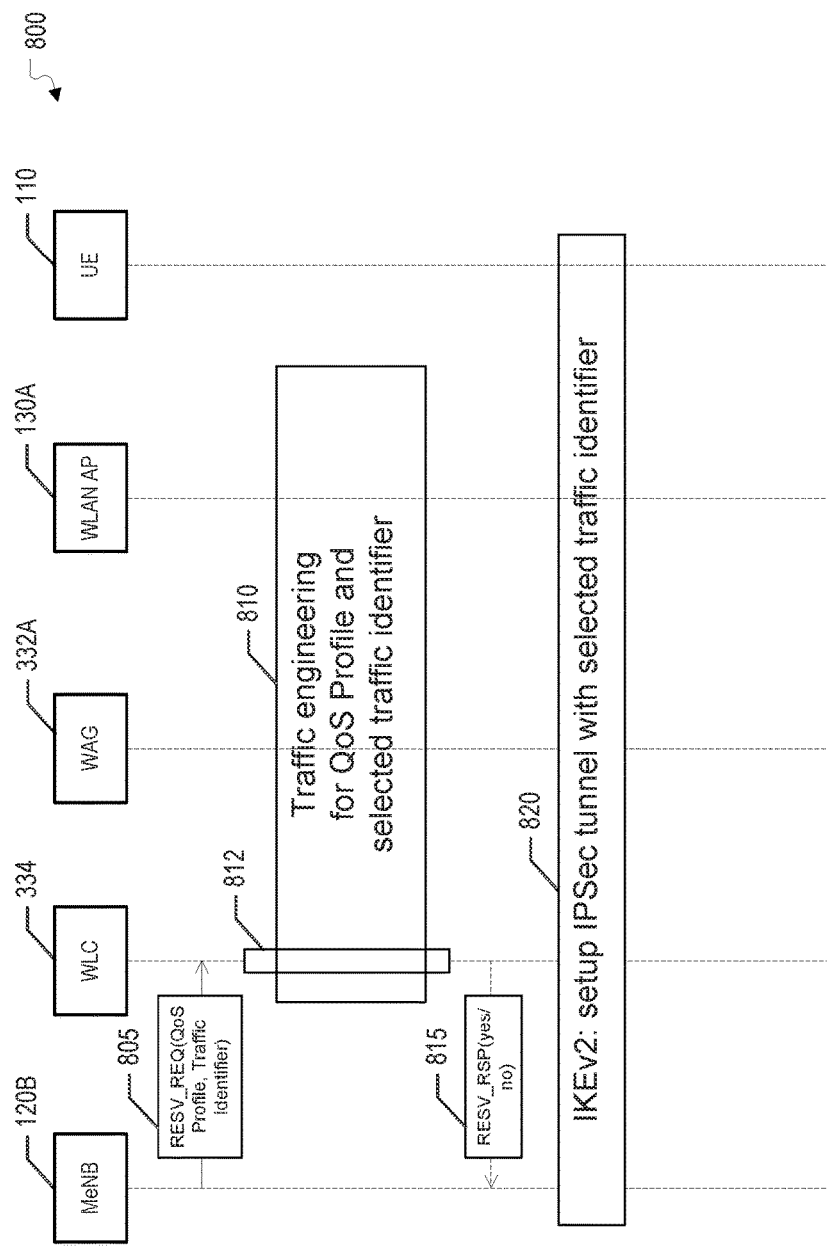
FIG. 8 illustrates a flow diagram of an example process for WLAN radio bearer setup may be implemented in accordance with one or more implementations.

FIG. 8 illustrates a flow diagram of an example process 800 for WLAN radio bearer setup may be implemented in accordance with one or more implementations. For explanatory purposes, the example process 800 is described herein with reference to the example network environment 400 of FIG. 4; however, the example process 800 is not limited to the example network environment 400 of FIG. 4. The blocks of example process 800 are described herein as occurring in serial, or linearly. However, multiple blocks of example process 800 may occur in parallel. In addition, the blocks of example process 800 need not be performed in the order shown and/or one or more of the blocks of example process 800 need not be performed.

For each RAB being offloaded over WLAN, the base station 120B sends a QoS reservation request (RESV_REQ) to the controller 334 (e.g., the WLC) (805). The QoS reservation request may include a QoS profile and a differentiated services code point (DSCP) value to be used on an outside IP header for the packets of the same RAB. The DSCP value may identify a level of service and/or type of service being requested by the user device 110. The DSCP may be referred to as a traffic identifier. Thus, the base station 120B may provision the WLAN access for each RAB.

The controller 334 facilitates traffic engineering for the QoS profile and the selected traffic identifier contained in the reservation request (810). A time interval 812 may provide a lifetime within which the traffic engineering is to be completed. The traffic engineering may be performed by the controller 334, gateway device 332A, and access point 130A to configure themselves to allow communication over the RAB to occur based on the QoS profile and the selected traffic identifier. For instance, the controller 334, gateway device 332A, and/or access point 130A may attempt to reserve a requested bandwidth for the RAB. The controller 334 transmits a reservation response (RESV_RSP) to the user device 110 (815). The controller 334 may indicate that resources corresponding to the QoS profile and selected traffic identifier were successfully reserved or not successfully reserved.

The base station 120B facilitates setting up a tunnel (e.g., an IPSec tunnel) with the selected traffic identifier using an Internet Key Exchange protocol (e.g., IKEv2) between the base station 120B and the user device 110 (820). The base station 120B may proceed with setting up the tunnel between the user device 110 and the base station 120B even in the case that the reservation response indicates that the resources were not successfully reserved.

The controller 334 may derive the QoS to apply between the gateway device 332A and the access point 130A for downlink user plane IP traffic. The access point 130A may map this QoS to a corresponding IEEE 802.11 access class. In general, the QoS utilized between the gateway device 332A (e.g., a WAG or a trusted WAG (TWAG)) and the access point 130A are implementation dependent.

When the user device 110 receives an IP packet, the user device 110 can store a 5-tuple corresponding to the IP flow together with the IEEE 802.11 access class used on the air. The 5-tuple may include a source IP address, source port number, destination IP address, destination port number, and protocol in use. When the user device 110 sends an IP packet, the user device 110 may derive the IEEE 802.11 access class to be used on the air from previously stored information for the IP flow. If there is no stored information for this IP flow, the user device 110 may use a default IEEE 802.11 access class.

Figure 9:
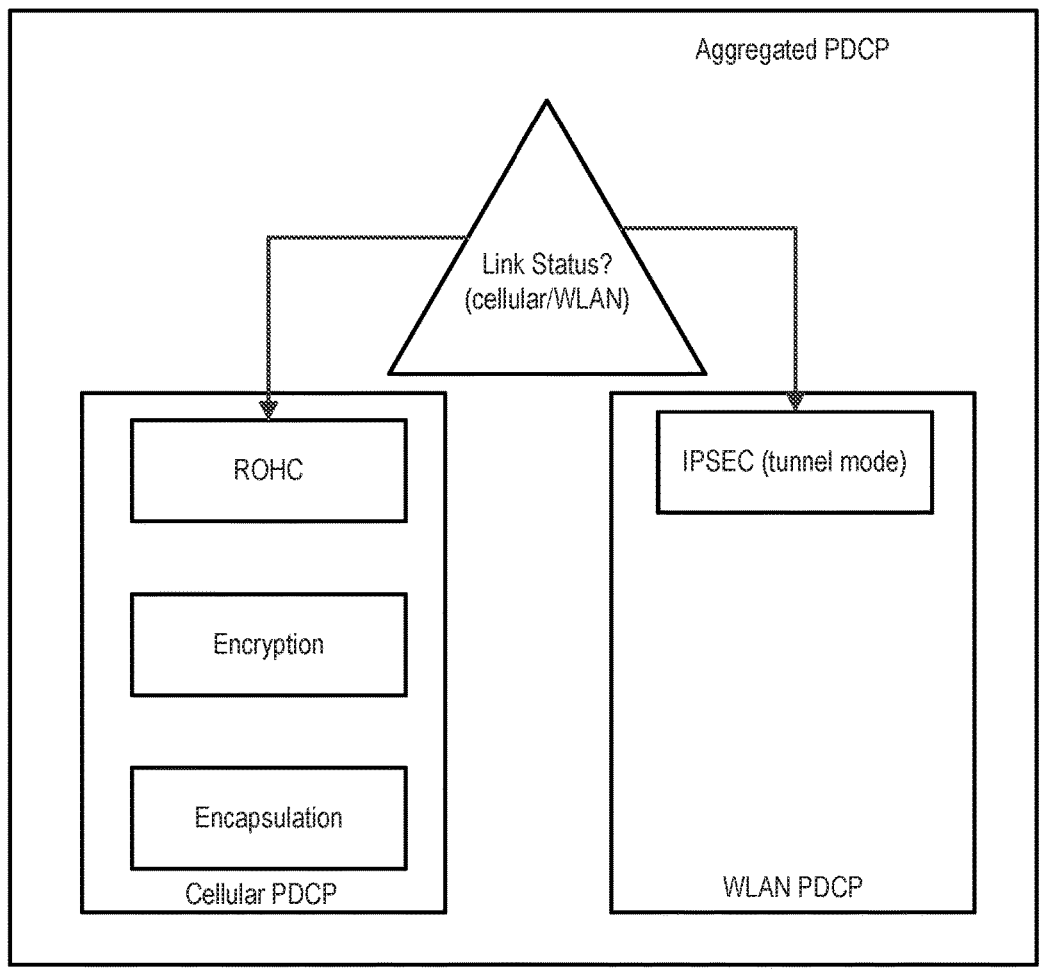
FIG. 9 illustrates an example aggregated Packet Data Convergence Protocol (PDCP) entity in accordance with one or more implementations.

In one or more implementations, the subject technology allows aggregation of cellular and WLAN communications. FIG. 9 illustrates an example aggregated Packet Data Convergence Protocol (PDCP) entity in accordance with one or more implementations. Each PDCP entity may be carrying the data of one radio bearer. The PDCP entity may be associated with an LCID. The aggregated PDCP entity may facilitate cellular-WLAN interworking by allowing processing of the data based on whether the data is to be transmitted over cellular or over WLAN. A decision as to whether to transmit over cellular or over WLAN may be based on throughput and/or latency associated with the cellular link and the WLAN link.

In a case that a packet is to be sent over WLAN, the aggregated PDCP entity may be considered a WLAN PDCP entity. This serving PDCP entity may be represented by an end tunnel of the IPSec link. The packet may be encrypted using IPSec and transmitted over an IPSec tunnel between, e.g., the user device 110 and the base station 120B. The use of the IPSec tunnel is provided as an example, and other IP-based tunneling mechanisms may be used by the WLAN PDCP entity instead of the IPSec tunnel. In a case that a packet is to be sent over cellular, the aggregated PDCP entity may be considered a cellular PDCP entity. The packet may be processed using robust header compression (ROHC), encrypted, and encapsulated in accordance with a cellular standard (e.g., LTE standard). In some cases, a decision as to whether the packet is to be transmitted over cellular or over WLAN may be made after PDCP processing of the packet.

The aggregated PDCP entity may be utilized as a bearer switch, in which the access bearer may be served by only one access (e.g., either cellular or WLAN) at a time. Alternatively, the aggregated PDCP entity may be utilized as a bearer split, in which both cellular access and WLAN access are available to the RAB at the same time. In this case, some packets, and/or portions of packets, received by the base station 120B may be transmitted using the cellular access while other packets, and/or portions of packets, received by the base station 120B may be transmitted using the WLAN access.

In one or more implementations, the user device 110 performs a network discovery and selection procedure for selecting and associating/attaching to a WLAN and a base station that together facilitate cellular-WLAN interworking. The user device 110 attempts to discover and select a suitable tuple (e.g., WLAN access point, base station), where the base station may act as a macrocell for WLAN when a policy (e.g., cellular-WLAN interworking policy) on the user device 110 is active and the user device 110 indicates the policy is active.

Figure 10:
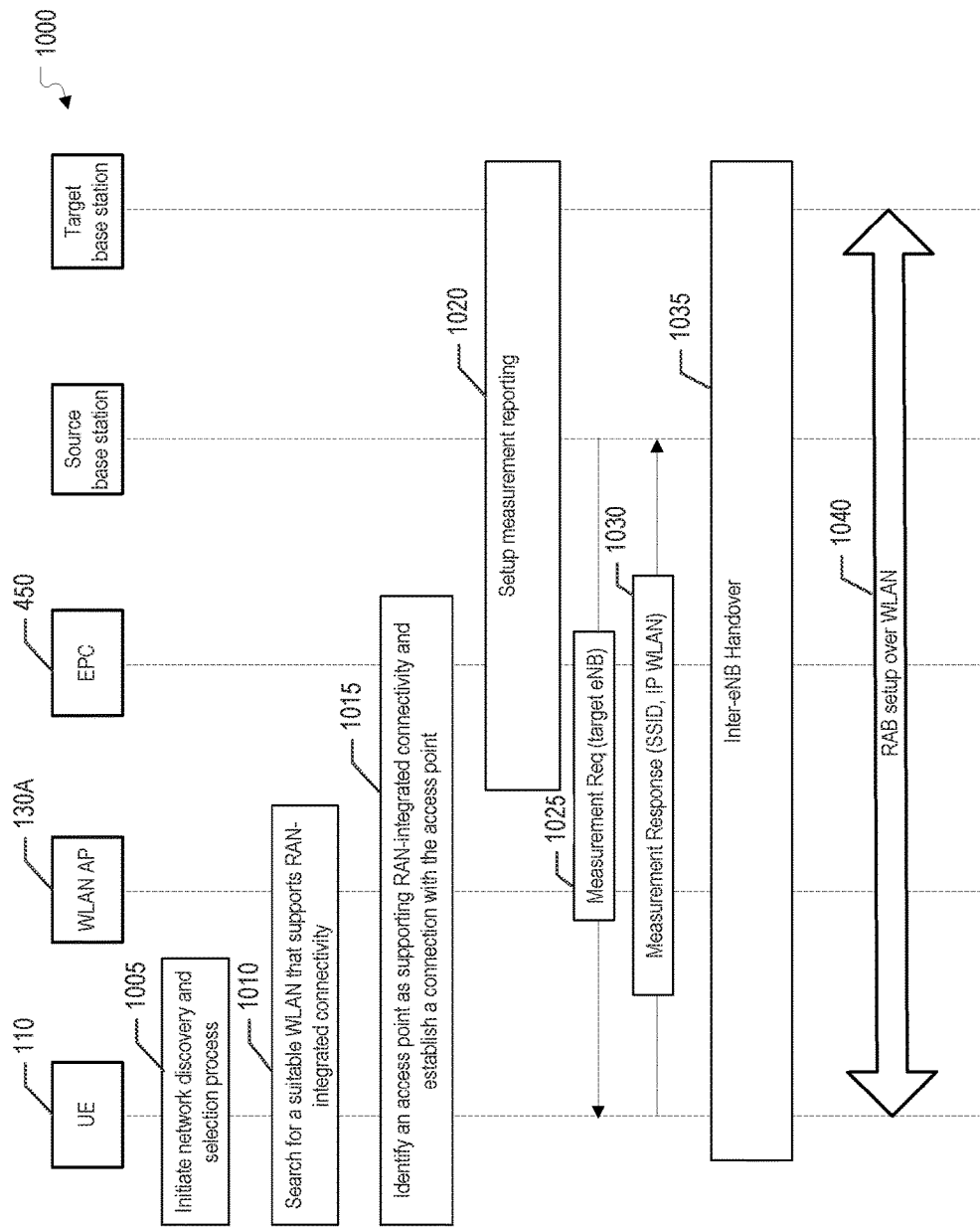
FIGS. 10 and 11 illustrate flow diagrams of example processes in which cellular-WLAN interworking may be implemented in accordance with one or more implementations.

FIG. 10 illustrates a flow diagram of an example process 1000 in which cellular-WLAN interworking may be implemented in accordance with one or more implementations. For explanatory purposes, the example process 1000 is described herein with reference to the example network environment 400 of FIG. 4, however, the example process 1000 is not limited to the example network environment 400 of FIG. 4. The blocks of example process 1000 are described herein as occurring in serial, or linearly. However, multiple blocks of example process 1000 may occur in parallel. In addition, the blocks of example process 1000 need not be performed in the order shown and/or one or more of the blocks of example process 1000 need not be performed.

The user device 110 initiates a network discovery and selection process (1005). The user device 110 may be associated with a base station that does not support RAN-based WLAN interworking. The base station may be referred to as a source base station. In initiating the network discovery and selection process, the user device 110 may cause a policy associated with RAN-based WLAN interworking connectivity to become active.

The user device 110 may receive an indication to perform (e.g., allow, facilitate) cellular-WLAN interworking. The user device 110 may initiate seeking of a RAN-based WLAN interworking connectivity responsive to the indication. The indication may be based on user preferences and/or an operator active policy on the user device 110 indicating that a RAN-based WLAN interworking connectivity should be sought. In some cases, the RAN may initiate the network discovery and selection process by indicating to user devices (e.g., including the user device 110) under its coverage that the user devices should seek a WLAN that provides RAN integrated connectivity. Triggering of initiating the network discovery and selection process may be provided by base stations (e.g., the source base station) that do not support cellular-WLAN interworking. A probe request and response procedure between the user device 110 and one or more access points (e.g., the access point 130A) may be utilized to reduce delay in discovery and/or to enable discovery (e.g., of closed WLAN networks). Closed WLAN networks may include WLAN networks that do not broadcast their service set identifier (SSID).

The user device 110 searches for a suitable WLAN (e.g., a suitable WLAN access point) that supports RAN-integrated connectivity (1010). The user device 110 may be informed of such capability of the access point 130A through an extension of a 3rd Generation Partnership Project (3GPP) Access Network Query Protocol (ANQP) container with a new capability bit per public land mobile network (PLMN). For instance, the 3GPP ANQP container may be exchanged between the user device 110 and the access point 130A pre-association.

The user device 110 identifies the access point 130A as supporting RAN-integrated connectivity and establishes a connection with the access point 130A (1015). The user device 110 may associate with the access point 130A and authenticate and establish local IP connectivity. Authentication may involve the EPC 450, the AAA server 336, the HSS 338, and/or the MME 340. In some cases, a non-seamless WLAN offload (NSWO) may also be established.

During the authentication procedure, the AAA server 336, through the HSS 338 and MIME 340, sets up measurement reporting (1020). The AAA server 336 may identify a suitable target base station (e.g., the base station 120B) that integrates the WLAN (e.g., the access point 130A) to which the user device 110 has associated. The AAA server 336 may inform the source base station to trigger WLAN measurement reports on the target base station. The source base station triggers the WLAN measurement reports for the target base station (1025).

If the user device 110 is under the coverage area of the target base station, the user device 110 informs the source base station that the user device 110 is under the coverage area of the target base station and sends a measurement response to the source base station (1030). The user device 110 may send, to the source base station, an SSID and its local IP address (IP WLAN) of the interface facing the WLAN datapath. For instance, the user device 110 may send an IP address of the access point 130A to the source base station and/or an IP address of a gateway device (e.g., the gateway device 332A) associated with the access point 130A. The source base station triggers a handover (e.g., an inter-eNB handover) from the source base station to the target base station (1035). The source base station may trigger the handover based on the measurement response from the user device 110. The target base station establishes one or more RABs to be served over WLAN access (e.g., over the access point 130A) (1040).

Figure 11:
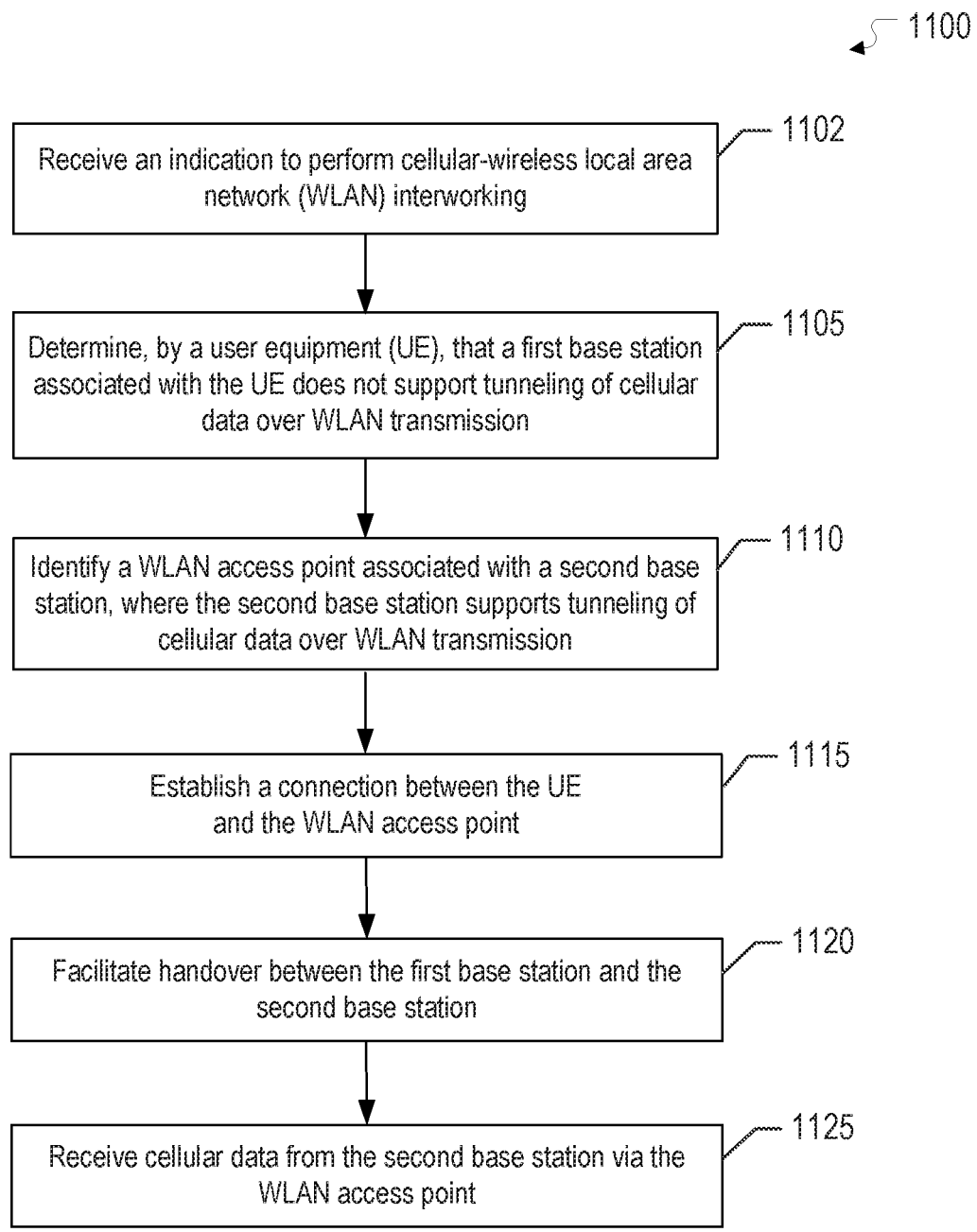

FIG. 11 illustrates a flow diagram of an example process 1100 in which cellular-WLAN interworking may be implemented in accordance with one or more implementations. For explanatory purposes, the example process 1100 is described herein with reference to the user device 110 of the example network environment 100 of FIG. 1; however, the example process 1100 is not limited to the user device 110 of the example network environment 100 of FIG. 1, and the example process 1100 may be performed by one or more components of the user device 110. The blocks of example process 1100 are described herein as occurring in serial, or linearly. However, multiple blocks of example process 1100 may occur in parallel. In addition, the blocks of example process 1100 need not be performed in the order shown and/or one or more of the blocks of example process 1100 need not be performed.

The user device 110 receives an indication to perform cellular-WLAN interworking (1102). For instance, the indication may be based on user preferences and/or an operator active policy on the user device 110 indicating that a RAN-based WLAN interworking connectivity should be sought. The user device 110 may conduct a search of WLAN access points to locate access points that support tunneling of cellular data over WLAN transmission. Among access points that support tunneling of cellular data over WLAN transmission, the user device 110 may identify (e.g., select) the access point associated with higher power measurements (e.g., signal-to-noise ratio (SNR), received signal strength indicator (RSSI)), such as the access point 130A.

The user device 110 then determines that a first base station that is currently serving the user device 110 does not support tunneling of cellular data over WLAN transmission (1105). The user device 110 identifies the access point 130A as being associated with a second base station (e.g., the base station 120B) (1110), where the second base station supports tunneling of cellular data over WLAN transmission. The user device 110 establishes a connection between the user device 110 and the access point 130A (1115).

The user device 110 facilitates handover between the first base station and the second base station (1120). To facilitate the handover, the user device 110 may receive a request for information from the first base station and transmit a response to the first base station. In some cases, the user device 110 may transmit an SSID and/or an IP address associated with the access point 130A to the first base station. Based on the response from the user device 110, the first base station may trigger an inter-eNB handover from the first base station to the second base station. Once the handover is successfully completed, the user device 110 receives cellular data from the second base station via the access point 130A (1125).

In one or more implementations, the subject technology may be utilized in dense, venue type of deployment in which multiple WLAN access points (e.g., the WLAN access points 130A-B) are deployed in order to provide one or more user equipment (e.g., the user device 110) with improved over the air aggregated throughput. In some cases, WLAN AP cell size may be reduced. For instance, lower data rates allowed by the WLAN access point cell may be disabled. Utilizing (e.g., enforcing) the higher data rates to connected clients may facilitate smooth roaming and load balancing in a dense deployment, and/or may contribute to a reduction in a physical boundary of the WLAN access point cell size. A receive cell size may be reduced to reduce or avoid interference from co-channels. This may allow alignment of the receive cell size with a designed transmitter cell size, and/or may facilitate reduction of overall channel utilization in high density environments. In some cases, to sustain over the air throughput between around 1 Gbps and 3.5 Gbps (e.g., provided by IEEE 802.11 ac access points), synchronization of a desired Ethernet Gigabit link and the over the air stream may be needed.

In some implementations, small cellular cells and WLAN access points are integrated into a single access device or otherwise collocated. The smaller cellular cells may share the backhaul with the WLAN APs. Such implementations may allow advantages of for example, sharing hardware, software, power, backhaul, and/or secure housing. The small cellular cells may include, may be, or may be a part of an HeNB. In some cases, the cellular component of the single access device may allow improved coverage, and/or areas where coverage is provided by the WLAN may allow higher throughput than the cellular component. In areas covered by the cellular component but not the WEAN component, all the data traffic may be routed through the cellular component. The subject technology may allow usage of unlicensed space using WEAN technology, such as using WLAN modems.

The subject technology may co-exist with other cellular-WLAN interworking mechanisms and avoid impact to the IEEE 802.11 specification. In some cases, aggregation of cellular and WLAN is transparent to the EPC (e.g., the EPC 450) and/or does not prevent discovery and use of other WEAN based on user preferences. The subject technology may allow improved mobility to or from WEAN, improved network control of WEAN offload, and/or improved overall UE throughput by using both cellular and WEAN access.

Figure 12:
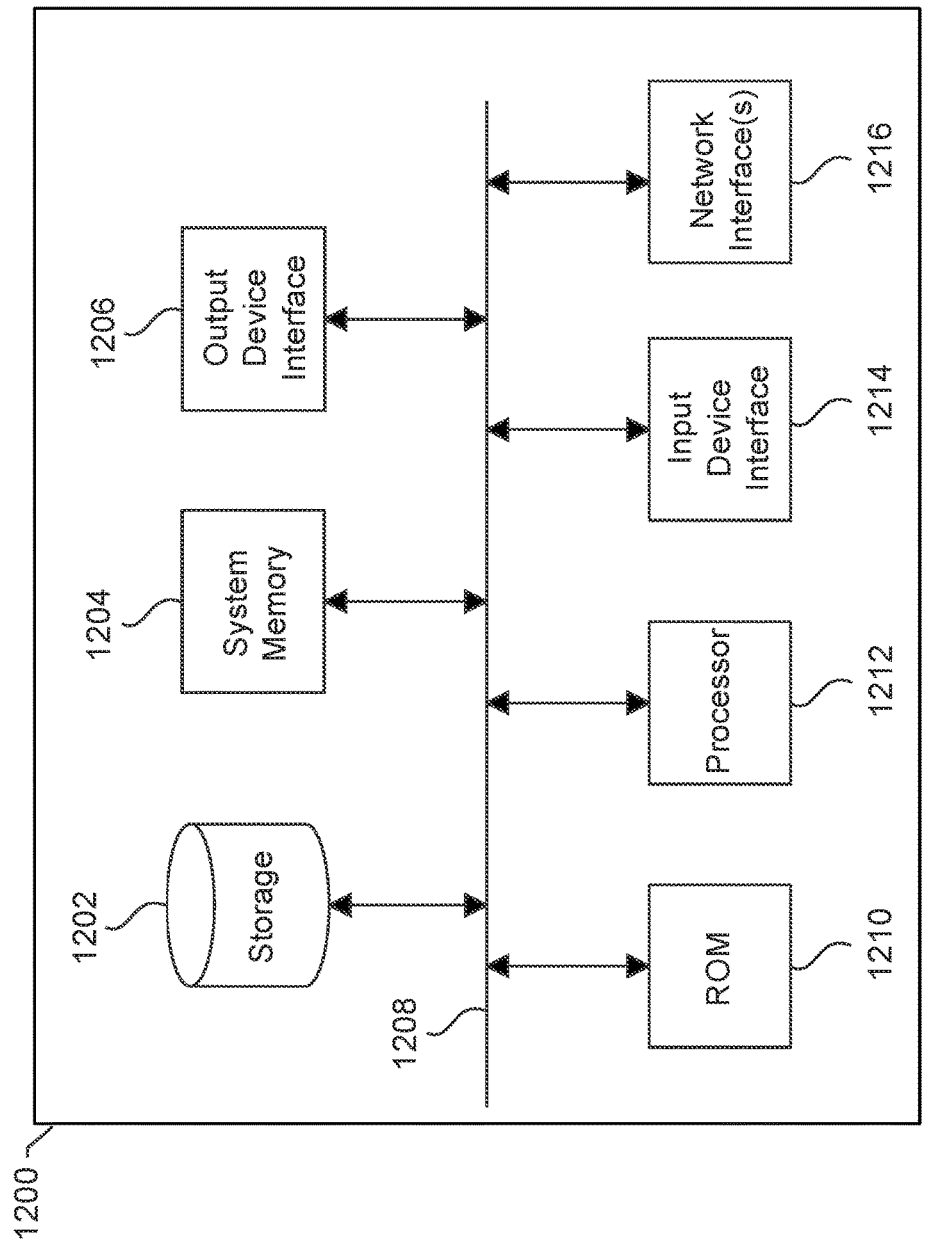
FIG. 12 conceptually illustrates an electronic system with which one or more implementations of the subject technology may be implemented.

FIG. 12 conceptually illustrates an electronic system 1200 with which one or more implementations of the subject technology may be implemented. The electronic system 1200, for example, may be, or may be coupled to, a gateway device, a set-top box, a desktop computer, a laptop computer, a tablet computer, a server, a switch, a router, a base station, a receiver, a phone, a PDA, or generally any electronic device that transmits signals over a network. The electronic system 1200 can be, and/or can be a part of one or more of the user device 110, base stations 120A-B, and/or access points 130A-B. Such an electronic system includes various types of computer readable media and interfaces for various other types of computer readable media. The electronic system 1200 includes a bus 1208, one or more processor(s) 1212, a system memory 1204 or buffer, a read-only memory (ROM) 1210, a permanent storage device 1202, an input device interface 1214, an output device interface 1206, and one or more network interface(s) 1216, or subsets and variations thereof.

The bus 1208 collectively represents all system, peripheral, and chipset buses that communicatively connect the numerous internal devices of the electronic system 1200. In one or more implementations, the bus 1208 communicatively connects the one or more processor(s) 1212 with the ROM 1210, the system memory 1204, and the permanent storage device 1202. From these various memory units, the one or more processor(s) 1212 retrieve instructions to execute and data to process in order to execute the processes of the subject disclosure. The one or more processor(s) 1212 can be a single processor or a multi-core processor in different implementations.

The ROM 1210 stores static data and instructions that are needed by the one or more processor(s) 1212 and other modules of the electronic system 1200. The permanent storage device 1202, on the other hand, may be a read-and-write memory device. The permanent storage device 1202 may be anon-volatile memory unit that stores instructions and data even when the electronic system 1200 is off. In one or more implementations, a mass-storage device (such as a magnetic or optical disk and its corresponding disk drive) may be used as the permanent storage device 1202.

In one or more implementations, a removable storage device such as a floppy disk, flash drive, and its corresponding disk drive) may be used as the permanent storage device 1202. Like the permanent storage device 1202, the system memory 1204 may be a read-and-write memory device. However, unlike the permanent storage device 1202, the system memory 1204 may be a volatile read-and-write memory, such as random access memory. The system memory 1204 may store any of the instructions and data that one or more processor(s) 1212 may need at runtime. In one or more implementations, the processes of the subject disclosure are stored in the system memory 1204, the permanent storage device 1202, and/or the ROM 1210. From these various memory units, the one or more processor(s) 1212 retrieve instructions to execute and data to process in order to execute the processes of one or more implementations.

The bus 1208 also connects to the input and output device interfaces 1214 and 1206. The input device interface 1214 enables a user to communicate information and select commands to the electronic system 1200. Input devices that may be used with the input device interface 1214 may include, for example, alphanumeric keyboards and pointing devices (also called "cursor control devices"). The output device interface 1206 may enable, for example, the display of images generated by the electronic system 1200. Output devices that may be used with the output device interface 1206 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 12, the bus 1208 also couples the electronic system 1200 to one or more networks (not shown) through one or more network interface(s) 1216. One or more network interface(s) may include an Ethernet interface, a WiFi interface, a cellular interface, a mmWave interface, a reduced gigabit media independent interface (RGMII), or generally any interface for connecting to a network. The one or more network interfaces 1216 may include, or may be coupled to, a physical layer module. In this manner, the electronic system 1200 can be a part of one or more networks of computers (such as a local area network (LAN), a wide area network (WAN), or an Intranet, or a network of networks, such as the Internet. Any or all components of the electronic system 1200 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration," Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender her and its) and vice versa. Headings and subheadings, if any, are used for convenience only and do not limit the subject disclosure.

What is claimed is:

1. A device, comprising: at least one processor circuit configured to:
   receive a packet comprising a first tunnel identifier, the packet being addressed to a user equipment (UE);
   identify a radio bearer associated with the first tunnel identifier of the received packet addressed to the user equipment, the radio bearer configured to facilitate transmission of the packet to the UE via cellular communications;
   determine whether the radio bearer has been offloaded over at least a portion of a wireless local area network (WLAN); and
   when the radio bearer has been offloaded over the at least the portion of the WLAN:
   identify a second tunnel identifier mapped to the radio bearer; encapsulate the packet based on the second tunnel identifier, wherein the encapsulated packet comprises the second tunnel identifier; and
   transmit the encapsulated packet to the UE over the at least the portion of the WLAN,
   wherein the at least one processor circuit is configured to determine that the radio bearer has been offloaded over the at least the portion of the WLAN based at least in part on a mapping of a logical channel index (LCID) of the radio bearer to a security parameter index (SPI) of an Internet Protocol Security (IPSec) tunnel.

2. The device of claim 1, wherein the at least one processor circuit is further configured to:
   when the radio bearer has not been offloaded over the at least the portion of the WLAN:
   encapsulate the packet in a media access control (MAC) protocol data unit (PDU), wherein a header of the MAC PDU comprises a logical channel identifier (LCID) of the radio bearer; and
   transmit the packet encapsulated in the MAC PDU to the UE via the radio bearer.

3. The device of claim 1, wherein the first tunnel identifier comprises a tunnel endpoint identifier (TEID) of a general packet radio service tunneling protocol (GTP) tunnel and the second tunnel identifier comprises a security parameter index (SPI) of an Internet Protocol Security (IPSec) tunnel.

4. The device of claim 3, wherein encapsulating the packet comprises encrypting the packet using IPSec.

5. The device of claim 3, wherein the TEID of the GTP tunnel is associated with a logical channel index (LCID) of the radio bearer and the LCID of the radio bearer is mapped to the SPI of the IPSec tunnel.

6. The device of claim 1, wherein the at least one processor circuit is configured to determine that the radio bearer has been offloaded over the at least the portion of the WLAN based at least in part on a mapping of a logical channel index (LCID) of the radio bearer to a security parameter index (SPI) of an Internet Protocol Security (IPSec) tunnel.

7. The device of claim 1, wherein the at least one processor circuit is further configured to:
   receive a plurality of packets comprising the first tunnel identifier, the plurality of packets being addressed to the UE;
   transmit at least one of the plurality of packets to the UE over the at least the portion of the WLAN; and
   transmit at least one of the plurality of packets to the UE via the radio bearer.

8. A computer program product comprising instructions stored in a non-transitory computer-readable storage medium, the instructions comprising:
   instructions to receive a first packet comprising a first tunnel identifier, the first packet being addressed to a user equipment (UE);
   instructions to identify a radio bearer associated with the first tunnel identifier of the received first packet addressed to the user equipment, the radio bearer configured to facilitate transmission of the packet to the UE via cellular communications;
   instructions to determine whether the radio bearer has been offloaded over at least a portion of a wireless local area network (WLAN) based at least in part on a mapping of a logical channel index (LCID) of the radio bearer to a security parameter index (SPI) of an Internet Protocol Security (IPSec) tunnel; and
   when the radio bearer has been offloaded over the at least the portion of the WLAN:
   instructions to generate a second packet based on a first encapsulation of the first packet, wherein the second packet comprises a second tunnel identifier mapped to the radio bearer; and
   instructions to transmit the second packet to the UE over the at least the portion of the WLAN.

9. The computer program product of claim 8, wherein the instructions further comprise, when the radio bearer has not been offloaded over the at least, the portion of the WLAN:
   instructions to generate a third packet based on a second encapsulation of the first packet, wherein the third packet comprises a logical channel identifier (LCID) of the radio bearer; and instructions to transmit the third packet to the UE via the radio bearer.

10. The computer program product of claim 8, wherein the first encapsulation comprises encapsulation of the first packet in an Internet Protocol Security (IPSec) packet.

11. The computer program product of claim 8, wherein the first tunnel identifier comprises a tunnel endpoint identifier (TEID) of a general packet radio service tunneling protocol (GTP) tunnel and the second tunnel identifier comprises a security parameter index (SPI) of an Internet Protocol Security (IPSec) tunnel.

12. The computer program product of claim 8, wherein the instructions further comprise:
   instructions to receive a plurality of packets comprising the first tunnel identifier, the plurality of packets being addressed to the UE;
   instructions to transmit at least one of the plurality of packets to the UE over at least the portion of the WLAN; and
   instructions to transmit at least one of the plurality of packets to the UE via the radio bearer.

13. A method, comprising:
   receiving a packet comprising a first tunnel identifier, the packet being addressed to a user equipment (UE);
   identifying a radio bearer associated with the first tunnel identifier of the received packet addressed to the user equipment, the radio bearer configured to facilitate transmission of the packet to the UE via cellular communications;
   determining whether the radio bearer has been offloaded over at least a portion of a wireless local area network (WLAN) based at least in part on a mapping of a logical channel index (LCID) of the radio bearer to a security parameter index (SPI) of an Internet Protocol Security (IPSec) tunnel: and
   when the radio bearer has been offloaded over the at least the portion of the WLAN:
      identifying a second tunnel identifier mapped to the radio bearer; encapsulating the packet based on the second tunnel identifier, wherein the encapsulated packet comprises the second tunnel identifier; and
   transmitting the encapsulated packet to the UE over the at least the portion of the WLAN.

14. The method of claim 13, further comprising:
   when the radio bearer has not been offloaded over the at least the portion of the WLAN:
   encapsulating the packet in a media access control (MAC) protocol data unit (PDU), wherein a header of the MAC PDU comprises a logical channel identifier (LCID) of the radio bearer; and
   transmitting the packet encapsulated in the MAC PDU to the UE via the radio bearer.

15. The method of claim 13, wherein the first tunnel identifier comprises a tunnel endpoint identifier (TEID) of a general packet radio service tunneling protocol (GTP) tunnel and the second tunnel identifier comprises a security parameter index (SPI) of an Internet Protocol Security (IPSec) tunnel.

16. The method of claim 15, wherein encapsulating the packet comprises encrypting the packet using IPSec.

17. The method of claim 15, wherein the TEID of the GTP tunnel is associated with a logical channel index (LCID) of the radio bearer and the LCID of the radio bearer is mapped to the SPI of the IPSec tunnel.

18. The method of claim 13, further comprising:
   determining that the radio bearer has been offloaded over the at least the portion of the WLAN based at least in part on a mapping of a logical channel index (LCID) of the radio bearer to a security parameter index (SPI) of an Internet Protocol Security (IPSec) tunnel.

19. The method of claim 13, further comprising:
   receiving a plurality of packets comprising the first tunnel identifier, the plurality of packets being addressed to the UE;
   transmitting at least one of the plurality of packets to the UE over the at least the portion of the WLAN; and
   transmitting at least one of the plurality of packets to the UE via the radio bearer.

* * * * *